Dec. 27, 1949  A. M. KIVARI ET AL  2,492,486
SEPARATING SOLIDS FROM A LIQUID
Filed July 10, 1948
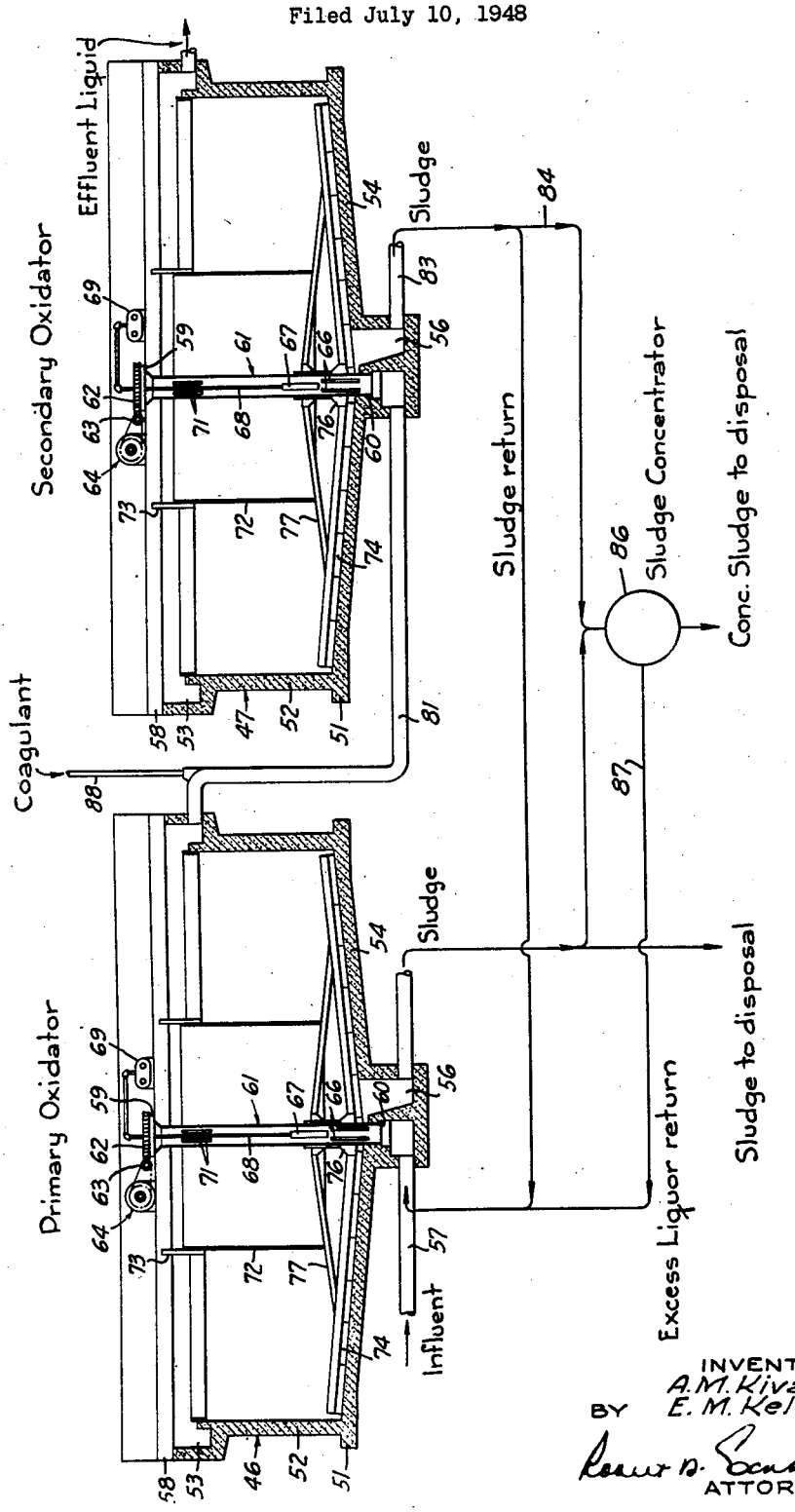
INVENTORS
A. M. Kivari
E. M. Kelly
BY
ATTORNEY Patented Dec. 27, 1949

2,492,486

UNITED STATES PATENT OFFICE 2,492,486

SEPARATING SOLIDS FROM A LIQUID

Arthur M. Kivari and Earl M. Kelly,
Los Angeles, Calif.

Application July 10, 1948, Serial No. 38,063

4 Claims. (Cl. 210—8)

This invention relates to improvements in separating solids from a liquid.

If a liquid containing solids suspended therein, other than particles in true colloidal suspension, is held in a quiescent state for a sufficiently long period of time, the solids settle and the clear liquid can be drawn off. Such an operation requires a considerable period of time; when the volume of liquid to be handled in a given time period is relatively large, the size of the equipment required will be inordinately large. To the end that the size of the equipment can be reduced and the rate of settling increased, various schemes and proposals have been advanced. The present invention is concerned with an improved process which is particularly suited to the clarification of a liquid such as water containing solid waste such as sewage or industrial waste waters. Such a liquid may contain solids in various sizes as well as solid organic matter having a biological oxygen demand (frequently abbreviated as B. O. D.) and dissolved organic matter. To render the liquid useful or capable of release it must be freed of solids, odors, and of organic matter so that it is stable, clear and remains so upon release.

The process of this invention includes the utilization of repeated aeration, agitation and sedimentation of the solid and dissolved organic matter present in the liquid to the end that the latter is clarified, its B. O. D. is completely satisfied and the liquid is clear and stable. The process will become further apparent upon a brief description of a preferred operation and of apparatus which can be employed to practise the invention. Briefly, such apparatus may include two units which are operated in series and each of which includes a relatively large body of liquid which is caused to flow through a tank or vessel having, in the preferred practise of the invention, three concentrically arranged compartments, an outer sedimentation compartment, an intermediate agitation compartment, and a central treatment compartment into which (1) a portion of the liquid and coagulated-aerated solids from the agitation compartment is admitted together with (2) fresh incoming liquid, the fresh liquid in the central treatment zone being mixed with that from the agitation compartment containing a larger concentration of solids. Solids settling in the first tank or vessel are removed for disposal while the effluent liquid resulting from the first aeration-flocculation-sedimentation operation is then subjected to a substantially similar treatment to remove remaining colloidal and dissolved organic matter and to provide a final effluent of relatively great clarity which is free of any objectionable odor and scum and substantially free of any solid matter. In this way, we are enabled to treat, for example, an industrial waste having an extremely high biological oxygen demand and which otherwise provides odor, and scum problems. Obviously, the process can be applied to less severe sewage and industrial wastes with equal success.

We have further found that the operation in the first liquid body is facilitated if a portion of the sludge resulting from the treatment of the second liquid body is returned and is mixed with incoming effluent and is then subjected to treatment in the first liquid body. In this manner, the overall use of air is reduced while the settling rate of solids in the first oxidation-flocculation-sedimentation treatment zone is increased; apparently, the solids which settle from the second liquid body and which have been repeatedly aerated and finally settled, have a definite and an increased affinity and floc-forming ability for like waste materials so that these assist in effecting coagulation, flocculation, and sedimentation.

In the case of liquids such as raw sewage having a biological oxygen demand, air is preferably admitted to each central compartment or treatment zone to assist in mixing and circulating the liquid therein, to freshen the liquid, reduce odors and scum and to satisfy the biological oxygen demand. In addition, the aeration of the fluid enables organic solids to be held in the tank for a period of far beyond that normally possible without encountering troublesome decomposition.

Sludge collection means may be provided in the agitation compartment to receive a sludge which separates out in that compartment and return this for re-introduction and mixing with the incoming fluid. In this way, maximum size particles are built up, these settling quite rapidly. This also enables an improved utilization, as will be described, to be made of any chemical added for treatment such as ferric chloride or other treatment agents. Mixing of at least a portion of a finely separated sludge with the incoming or raw effluent liquid containing additional solid particles results in an increase in the settling rate to the end that clarified liquid can be drawn off at a maximum rate per unit of vessel area or volume. Further, the return of at least a portion of the final sludge to an aeration zone results in an increase in the aeration effected in the sludge so that an aerobic sludge is built up and maintained.

It is an object of the present invention to provide an improved process for removal of solids and other objectionable components from a liquid such as sewage or an industrial waste.

The invention includes other features and objects of advantage, some of which, together with the foregoing, will appear hereinafter.

In the drawing, the single figure is a diagrammatic representation of suitable apparatus which can be employed and a flow sheet.

Referring to the drawing, we have indicated two substantially like units 46 and 47 and each of which includes a tank 51 having a wall 52 with an effluent trough 53 formed upon an upper portion of the wall. Each tank includes a bottom 54 sloping inwardly toward its center and including a sludge discharge pocket 56 and an inlet line 57 for the discharge of liquid to be treated. One or more beams 58 are extended across the tank to provide a support for a bearing 59 on which center column 61 is mounted for rotation. An annular wall 72 is supported from the transverse beams 58 above the tank bottom by several brackets 73, the wall separating the sedimentation compartment and the agitation compartment.

The central column 61 includes a gear 62 at its upper end which rests upon the bearing 59, the gear being enmeshed with a gear 63 driven by a prime mover generally indicated by numeral 64. At its lower end, the column is fitted into a seal 60 in the inlet pipe 57. The central column includes inlet ports 66 at its lower end so that sludge from the agitation compartment can be admitted to the influent liquid to mix with the liquid as it rises through the column 61. A diffuser 67 is provided in the column being supplied with air through line 68 from an air blower 69. The aerated sludge-influent liquid issues from ports 71 adjacent the upper portion of the liquid level in the tank, and causes agitation in the upper portion of the so-called agitation compartment, the region below this upper portion being one in which settlement occurs.

Mounted upon the central column for rotation with the column are a plurality of radial rakes 74, the rakes being supported upon the column at 76 and by braces 77. The rakes move the sludge toward the sludge pocket while that which is in suspension adjacent the ports 66 enters these to mix with the fresh liquid.

The mixing operation effected in each mixing zone in the central column between the fresh liquid and solids and the settled solids is effective to provide a zone of relatively high sludge concentration in the agitation compartment so that the sludge in the agitation compartment has a tendency to settle rapidly. That sludge which enters the sedimentation compartment has a relatively rapid settling rate so that the rate of liquid flow through the clarifier is relatively high and so that the final effluent liquid is clear and well aerated. If desired, a scum skimmer can be provided to remove any material which finds its way to the surface of the liquid in either or both tanks.

In operation, on a fluid such as raw sewage admitted to the treatment zone provided by column 61 in the first tank 46, the sewage is mixed with previously settled solids which are in an aerobic condition so that upon mixing of the solids, the fresh fluid is aerated and the solids quickly become aerobic and any B. O. D. is satisfied more readily and more completely.

To effect this, at least a portion of the sludge which passes through the sludge outlet 56 in tank 47 is withdrawn by pipe 83 and is returned to the influent line 57 on the first unit to mix with influent raw waste. The sludge return through pipe 83 can be continuous or intermittent depending upon the operation desired and upon the quantity of sludge produced. For example, if the sludge production is very heavy during certain periods, then some of the sludge can be taken off line 83 to line 84 and sent to a sludge concentrator 86 along with the sludge derived from the first unit 46. Liquid from the sludge concentrator 86 is returned to line 87 to the inlet to the first unit 46 through line 87.

If desired, a suitable coagulant such as ferric sulphate or iron containing salts such as ferric chloride, alum, chlorinated copperas or other suitable coagulant can be added to line 81 from a suitable feeder device through line 88.

The over-all results obtained will depend upon the type of wastes handled and the detention periods allowed in the first and secondary liquid bodies. For example, in handling an average domestic sewage we have found that with primary and secondary vessels of identical size, each having one hour average detention period in the center aeration mixing compartment plus two hours of sedimentation in the outer compartment and where an air addition amounting to 0.15 cfm. per gallon is applied to each, we will obtain an over-all removal of suspended solids and a reduction in B. O. D. amounting to approximately 85%. This can be increased by allowing longer detention periods in the mixing compartment of each unit. Likewise increased removals are obtainable through the use of a coagulant, preferably an iron compound applied to the liquid to be treated just ahead of the secondary body of liquid.

The use of air, together with the internal aeration and recirculation with partially conditioned precipitated solids brings about an acceleration of the normal purification process, making possible a degree of treatment which is ordinarily not obtainable except in complete treatment plants using trickling filters or activated sludge. The process of this invention enables a complete treatment of sewage and industrial wastes to be effected at a cost approximately half that otherwise necessary if ordinary complete treatment processes were employed.

Operating results in a packing house waste are as follows:

| Sample | Total Solids | Suspended Solids | Fats | pH |
| --- | --- | --- | --- | --- |
| Raw Waste | 5,350 | 3,970 | 266 | 7.2 |
| Primary Effluent | 1,290 | 200 | 12 | 7.3 |
| Secondary Effluent | 1,290 | 200 | 6 | 7.65 |
| Do | | 200 | 4 | 7.55 |

As a matter of interest, we would point out that slaughter house wastes are exceptionally difficult to treat; the effluent was free of any odor or scum.

We claim:

1. In a process of clarifying a mixture of liquid and suspended solids in which the liquid is passed consecutively through first and second pools in which settlement of solids takes place to form sludge of downwardly increasing density and clarified liquid of upwardly increasing clarity, relatively dense sludge being removed from the lower portions of each pool, the improvement which comprises introducing previously settled sludge from the first pool into the incoming mixture, aerating the resulting mass, introducing the aerated mass into a zone in the first pool in which settlement of some of the solids occurs with resultant production of a partially clarified liquid, passing the partially clarified liquid into a second zone in the pool in which further settlement and clarification occurs to produce a second partially clarified liquid, introducing said second partially clarified liquid into the second pool, introducing settled sludge from the second pool into said second partially clarified liquid, aerating the resulting mass and introducing this aerated mass into a zone in the second pool in which settlement of some of the solids occurs with resultant production of a third partially clarified liquid, and passing the third clarified liquid into a second zone in the second pool in which further settlement and clarification occurs to produce a final clarified liquid.

2. Process according to claim 1 in which sludge settled out in the second pool is introduced into the incoming mixture to the first pool and aerated therewith.

3. Process according to claim 1 in which a coagulant is introduced into the second partially clarified liquid prior to introducing this liquid into the second pool.

4. Process according to claim 1 in which sludge settled out in the second pool is introduced into the incoming mixture to the first pool and aerated therewith and a coagulant is introduced into the second partially clarified liquid prior to introducing it into the second pool.

ARTHUR M. KIVARI.
EARL M. KELLY.

REFERENCES CITED

The following references are of record in the file of this patent:

UNITED STATES PATENTS

| Number | Name | Date |
|---|---|---|
| 2,217,143 | Stevenson | Oct. 8, 1940 |
| 2,223,257 | Mallory | Nov. 26, 1940 |
| 2,233,792 | Mallory | Mar. 4, 1941 |
| 2,324,400 | Kelly et al. | July 13, 1943 |
| 2,425,065 | Kivari | Aug. 5, 1947 |
| 2,444,671 | Prager | July 6, 1948 |
| 2,446,655 | Lawrason | Aug. 10, 1948 |